(12) United States Patent
Kayoiji

(10) Patent No.: US 10,359,926 B2
(45) Date of Patent: Jul. 23, 2019

(54) INFORMATION PROCESSING APPARATUS FOR PROCESSING PLURAL EVENT DATA GENERATED BY PROCESSING APPARATUS

(71) Applicant: CANON ANELVA CORPORATION, Asao-ku, Kawasaki-shi (JP)

(72) Inventor: Hiroki Kayoiji, Zama (JP)

(73) Assignee: Canon Anelva Corporation, Kawasaki-shi, Kanagawa-ken (JP)

( * ) Notice: Subject to any disclaimer, the term of this patent is extended or adjusted under 35 U.S.C. 154(b) by 301 days.

(21) Appl. No.: 14/172,974

(22) Filed: Feb. 5, 2014

(65) Prior Publication Data

US 2014/0351747 A1 Nov. 27, 2014

(30) Foreign Application Priority Data

May 24, 2013 (JP) .................................. 2013-110385

(51) Int. Cl.
*G06F 3/0485* (2013.01)
(52) U.S. Cl.
CPC ................................ *G06F 3/04855* (2013.01)
(58) Field of Classification Search
CPC .. G06F 3/0485; G06F 3/0483; G06F 3/04855; G06F 17/30884
See application file for complete search history.

(56) References Cited

U.S. PATENT DOCUMENTS 5,265,246 A * 11/1993 Li ..................... G06F 17/30398
715/974

5,339,391 A * 8/1994 Wroblewski ........ G06F 3/04855
345/607

(Continued)

FOREIGN PATENT DOCUMENTS

JP    2000-311045 A    11/2000
JP    2005-259930 A     9/2005
(Continued)

OTHER PUBLICATIONS

Alexander et al., "Revisiting Read Wear: Analysis, Design, and Evaluation of a Footprints Scrollbar", CHI 2009, pp. 1665-1674, Apr. 2009.*

(Continued)

*Primary Examiner* — Jennifer N To
*Assistant Examiner* — Joseph R. Burwell
(74) *Attorney, Agent, or Firm* — Buchanan Ingersoll & Rooney PC

(57) ABSTRACT

An information processing apparatus for processing a plurality of event data generated by a processing apparatus for processing a member, includes a determination unit which determines at least two event data existing at a preset interval in a time-series sequence of the plurality of event data, a specification unit which acquires a scroll request containing designation information for designating a position in the sequence from a scroll function incorporated in the information processing apparatus, and specify, as jump destination event data, event data at a position close to the position designated by the designation information in the sequence, among the at least two event data determined by the determination unit, and a control unit which causes the scroll function to start scrolling from or near the jump destination event data.

14 Claims, 5 Drawing Sheets

(56) References Cited

U.S. PATENT DOCUMENTS

| | | | | |
|---|---|---|---|---|
| 5,418,549 A * | 5/1995 | Anderson | G06F 9/451 | 715/786 |
| 5,479,600 A * | 12/1995 | Wroblewski | G06F 3/04855 | 715/777 |
| 5,506,951 A * | 4/1996 | Ishikawa | G06F 3/04855 | 715/777 |
| 5,510,808 A * | 4/1996 | Cina, Jr. | G06F 3/04855 | 345/684 |
| 6,204,846 B1 * | 3/2001 | Little | G06F 3/04855 | 715/784 |
| 6,421,071 B1 * | 7/2002 | Harrison | G01R 31/31935 | 715/787 |
| 8,589,977 B1 * | 11/2013 | Frusciano | H04N 5/44543 | 715/785 |
| 2004/0119753 A1 * | 6/2004 | Zencke | G06F 3/0485 | 715/786 |
| 2005/0204196 A1 | 9/2005 | Nishimura et al. | | |
| 2006/0200764 A1 * | 9/2006 | Sellers | G06F 3/0485 | 715/205 |
| 2007/0006099 A1 * | 1/2007 | Johnson | G06F 3/0485 | 715/828 |
| 2007/0089068 A1 * | 4/2007 | Alexander | G06F 3/0482 | 715/788 |
| 2007/0143705 A1 * | 6/2007 | Peters | G06F 3/04855 | 715/786 |
| 2007/0157128 A1 * | 7/2007 | Haug | G06Q 10/109 | 715/703 |
| 2008/0155463 A1 * | 6/2008 | Lian | G06F 3/04855 | 715/786 |
| 2009/0070707 A1 * | 3/2009 | Schaller | G06F 3/04855 | 715/787 |
| 2010/0306648 A1 * | 12/2010 | Wilairat | G06F 3/0488 | 715/702 |
| 2011/0113365 A1 * | 5/2011 | Kimmerly | G06F 9/4443 | 715/806 |
| 2011/0202871 A1 * | 8/2011 | Bair | G06F 3/04855 | 715/786 |
| 2011/0320976 A1 * | 12/2011 | Piersol | G06F 3/0483 | 715/810 |
| 2012/0042279 A1 * | 2/2012 | Naderi | G06F 3/04855 | 715/786 |
| 2012/0174005 A1 * | 7/2012 | Deutsch | G06F 3/04817 | 715/764 |
| 2013/0088510 A1 * | 4/2013 | Jardine-Skinner | G06F 9/4443 | 345/619 |
| 2013/0111396 A1 * | 5/2013 | Brid | G06F 3/0485 | 715/784 |
| 2015/0205478 A1 * | 7/2015 | Weber | G06F 3/0488 | 715/760 |

FOREIGN PATENT DOCUMENTS

| | | |
|---|---|---|
| JP | 2006-294831 A | 10/2006 |
| JP | 2007-259151 A | 10/2007 |
| JP | 2008-193491 A | 8/2008 |

OTHER PUBLICATIONS

Cahill et al., "Pager Bar", IBM Technical Disclosure Bulletin, v. 37, n. 1, pp. 483-484, Jan. 1994.*

Laakso et al., "Improved Scroll Bars", CHI 2000, pp. 97-98, Apr. 2000.*

Office Action (Grounds for Rejection) dated Jun. 23, 2014, by the Japan Patent Office in corresponding Japanese Patent Application No. 2013-110385, and an English Translation of the Office Action. (7 pages).

* cited by examiner

FIG. 1
PRIOR ART

| DATA LOG PERIOD: 2013/04/01 00:00:00~2013/04/03 00:00:00 | | |
|---|---|---|
| DATE/TIME | EVENT | MESSAGE |
| 2013/04/01 03:20:10 | XXXXXXXXXX | YYYYYYYYYY |
| 2013/04/01 03:20:34 | XXXXXXXXXX | YYYYYYYYYY |
| 2013/04/01 03:21:03 | XXXXXXXXXX | YYYYYYYYYY |
| 2013/04/01 03:21:05 | XXXXXXXXXX | YYYYYYYYYY |
| 2013/04/01 03:21:06 | XXXXXXXXXX | YYYYYYYYYY |
| 2013/04/01 03:21:08 | XXXXXXXXXX | YYYYYYYYYY |
| 2013/04/01 03:21:10 | XXXXXXXXXX | YYYYYYYYYY |
| 2013/04/01 03:21:15 | XXXXXXXXXX | YYYYYYYYYY |
| 2013/04/01 03:21:45 | XXXXXXXXXX | YYYYYYYYYY |
| 2013/04/01 03:21:46 | XXXXXXXXXX | YYYYYYYYYY |
| 2013/04/01 03:21:59 | XXXXXXXXXX | YYYYYYYYYY |
| 2013/04/01 03:23:40 | XXXXXXXXXX | YYYYYYYYYY |
| 2013/04/01 03:23:43 | XXXXXXXXXX | YYYYYYYYYY |
| 2013/04/01 03:23:48 | XXXXXXXXXX | YYYYYYYYYY |
| 2013/04/01 03:23:52 | XXXXXXXXXX | YYYYYYYYYY |
| 2013/04/01 03:24:01 | XXXXXXXXXX | YYYYYYYYYY |
| 2013/04/01 03:38:45 | XXXXXXXXXX | YYYYYYYYYY |
| 2013/04/01 03:38:46 | XXXXXXXXXX | YYYYYYYYYY |
| 2013/04/01 03:39:30 | XXXXXXXXXX | YYYYYYYYYY |
| 2013/04/01 03:39:31 | XXXXXXXXXX | YYYYYYYYYY |
| 2013/04/01 03:39:34 | XXXXXXXXXX | YYYYYYYYYY |
| 2013/04/01 03:39:35 | XXXXXXXXXX | YYYYYYYYYY |
| 2013/04/01 03:39:36 | XXXXXXXXXX | YYYYYYYYYY |
| 2013/04/01 03:39:36 | XXXXXXXXXX | YYYYYYYYYY |
| 2013/04/01 03:39:39 | XXXXXXXXXX | YYYYYYYYYY |
| 2013/04/01 03:39:40 | XXXXXXXXXX | YYYYYYYYYY |
| 2013/04/01 03:39:41 | XXXXXXXXXX | YYYYYYYYYY |
| 2013/04/01 03:39:47 | XXXXXXXXXX | YYYYYYYYYY | ially illustrating the operation

INFORMATION PROCESSING APPARATUS FOR PROCESSING PLURAL EVENT DATA GENERATED BY PROCESSING APPARATUS

This application claims the priority of Japanese Patent Application No. 2013-110385, filed May 24, 2013, which is hereby incorporated by reference herein in its entirety.

BACKGROUND OF THE INVENTION

Field of the Invention

The present invention relates to an information processing apparatus, an information processing method, and a computer-readable storage medium.

Description of the Related Art

Event data generated by a processing apparatus such as a semiconductor manufacturing apparatus (data indicating contents of events generated by the processing apparatus) can be accumulated in a database, and used to analyze the state of the processing apparatus or find out the cause of a malfunction of the processing apparatus.

FIG. 1 shows a case in which a plurality of event data generated by a processing apparatus are displayed on a display in a time-series. A window 1 on which event data are displayed can include an item 21 indicating an event occurrence date/time, an item 22 indicating an event type, and an item 23 indicating event detailed contents. The window 1 can include a scroll bar 10. The scroll bar 10 can include, for example, a scroll box 12 and a scroll thumb 14. As is well known, the scroll thumb 14 is used by the user to designate data of all displayable data to be actually displayed on the window 1 by scrolling the data. The data are designated by the position of the scroll thumb 14 in the scroll box 12.

When the user operates the scroll thumb 14 using an input device such as a mouse, a scroll function incorporated in a computer scrolls the event data displayed on the window 1. Note that when the scroll thumb 14 is operated (that is, when a scroll request is received), the scroll function sequentially accesses event data corresponding to the moving amount of the scroll thumb 14, and successively updates image data to be displayed on the window 1 while processing the event data.

If the number of event data is small, the event data are scrolled as soon as the scroll thumb 14 is operated. If, however, the number of event data is huge, the number of event data corresponding to the moving amount of the scroll thumb 14 is also huge, thereby prolonging the time taken to access and process the event data. In this case, the event data are not scrolled as soon as the user operates the scroll thumb 14. This has been a big factor that delays an operation for analyzing the state of the processing apparatus or finding out the cause of a malfunction of the processing apparatus.

SUMMARY OF THE INVENTION

The present invention provides a technique advantageous in increasing the scroll speed.

One of the aspects of the present invention provides an information processing apparatus for processing a plurality of event data generated by a processing apparatus for processing a member, comprising: a determination unit configured to determine at least two event data existing at a preset interval in a time-series sequence of the plurality of event data; a specification unit configured to acquire a scroll request containing designation information for designating a position in the sequence from a scroll function incorporated in the information processing apparatus, and specify, as jump destination event data, event data at a position close to the position designated by the designation information in the sequence, among the at least two event data determined by the determination unit; and a control unit configured to cause the scroll function to start scrolling from or near the jump destination event data.

Further features of the present invention will become apparent from the following description of exemplary embodiments with reference to the attached drawings.

BRIEF DESCRIPTION OF THE DRAWINGS

FIG. 1 is a view showing a case in which a plurality of event data generated by a processing apparatus are displayed on a display in a time-series;

DESCRIPTION OF THE EMBODIMENTS

Embodiments of the present invention will be described below with reference to the accompanying drawings.

Figure 2:
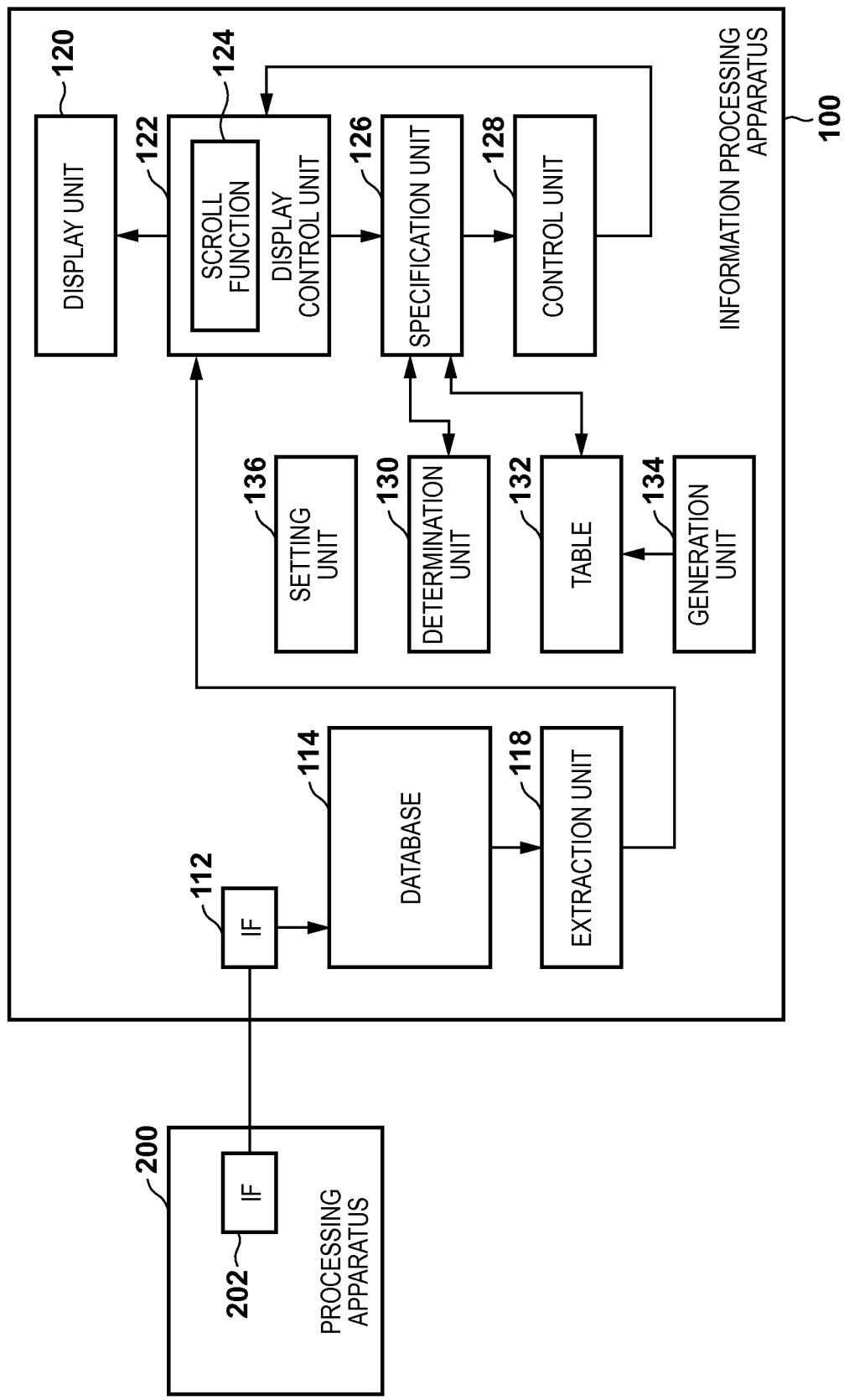
FIG. 2 is a block diagram showing the arrangement of an information processing apparatus according to an embodiment of the present invention.

FIG. 2 shows the arrangement of an information processing apparatus 100 according an embodiment of the present invention. The information processing apparatus 100 can be formed by, for example, incorporating a computer program in a general-purpose computer. The information processing apparatus 100 is configured to process a plurality of event data generated by a processing apparatus 200 for processing a member (data indicating contents of events generated by the processing apparatus). The processing apparatus 200 can be a manufacturing apparatus such as a semiconductor manufacturing apparatus (for example, a film forming apparatus, etching apparatus, or exposure apparatus). The processing apparatus 200 can include an interface 202 for transmitting event data to the information processing apparatus 100. The information processing apparatus 100 can include an interface 112 for receiving the event data from the processing apparatus 200. The information processing apparatus 100 accumulates the event data provided by the processing apparatus 200 in a database 114, as needed. The database 114 need only be usable by the information processing apparatus 100, and need not be provided in the housing of the information processing apparatus 100. The database 114 may be connected to a network to which the information processing apparatus 100 is connected. A plurality of event data can be accumulated in the database 114 in a time-series.

The information processing apparatus 100 can include a display unit (display) 120, a display control unit 122, a determination unit 130, a specification unit 126, and a control unit 128. The display control unit 122 generates image data to be displayed on the display unit 120, and supplies the image data to the display unit 120. The display control unit 122 includes a scroll function 124 of scrolling event data to be displayed on the display unit 120 in response to a user operation. The scroll function 124 is typically a function incorporated in the information processing apparatus 100 as an operating system or an application program running on the operating system.

The determination unit 130 determines at least two event data existing at preset intervals in the time-series sequence of a plurality of processing target event data. Note that the plurality of processing target event data may be the whole event data group stored in the database 114 as event data generated by the processing apparatus 200 or a plurality of event data extracted from the event data group by an extraction unit 118. The extraction unit 118 extracts event data satisfying designated conditions (for example, a period from which data should be extracted and an event type to be extracted) from the event data group.

Figure 4:
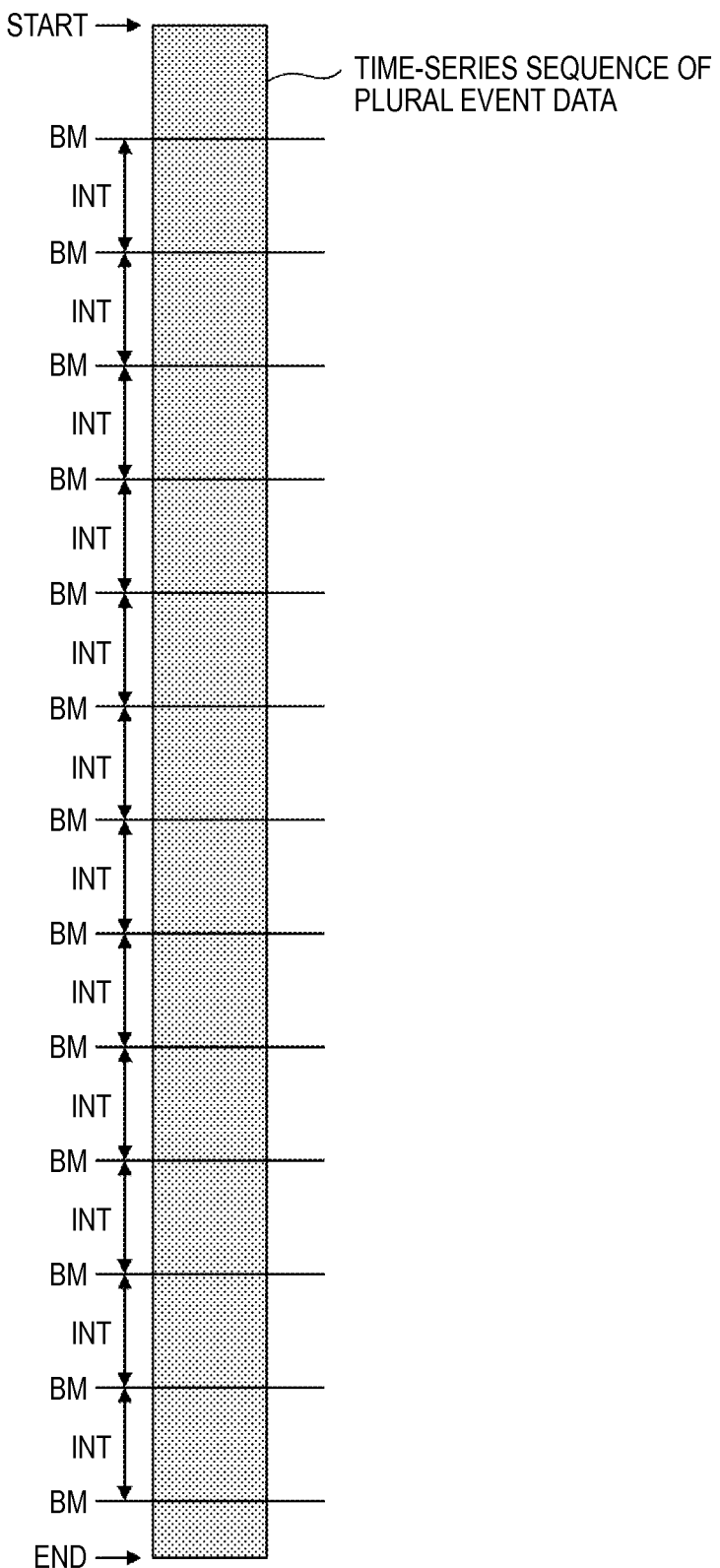
FIG. 4 is a view for explaining bookmarked event data (a plurality of event data existing at predetermined intervals in the time-series sequence of a plurality of processing target event data)

As schematically shown in FIG. 4, the determination unit 130 determines, as bookmarked event data BM, a plurality of event data existing at intervals INT in the time-series sequence of the plurality of processing target event data. Note that each bookmarked event data BM may or may not be added with identification data corresponding to a bookmark. In the latter case, the bookmarked event data are merely representations indicating the plurality of event data existing at the intervals INT in the time-series sequence of the plurality of processing target event data for the sake of convenience. There is no difference between bookmarked event data and other event data with respect to contents or data structure.

A setting unit 136 can arbitrarily set the interval INT. The setting unit 136 may determine the interval INT depending on the information processing capability of the information processing apparatus 100, determine the interval INT according to a user instruction, or determine the interval INT by another method.

The specification unit 126 acquires a scroll request containing designation information for designating a position in the time-series sequence of the plurality of processing target event data from the scroll function 124 incorporated in the information processing apparatus 100, and specifies, as jump destination event data, event data at a position close to the position designated by the designation information in the sequence among the bookmarked event data BM determined by the determination unit 130.

Figure 5:
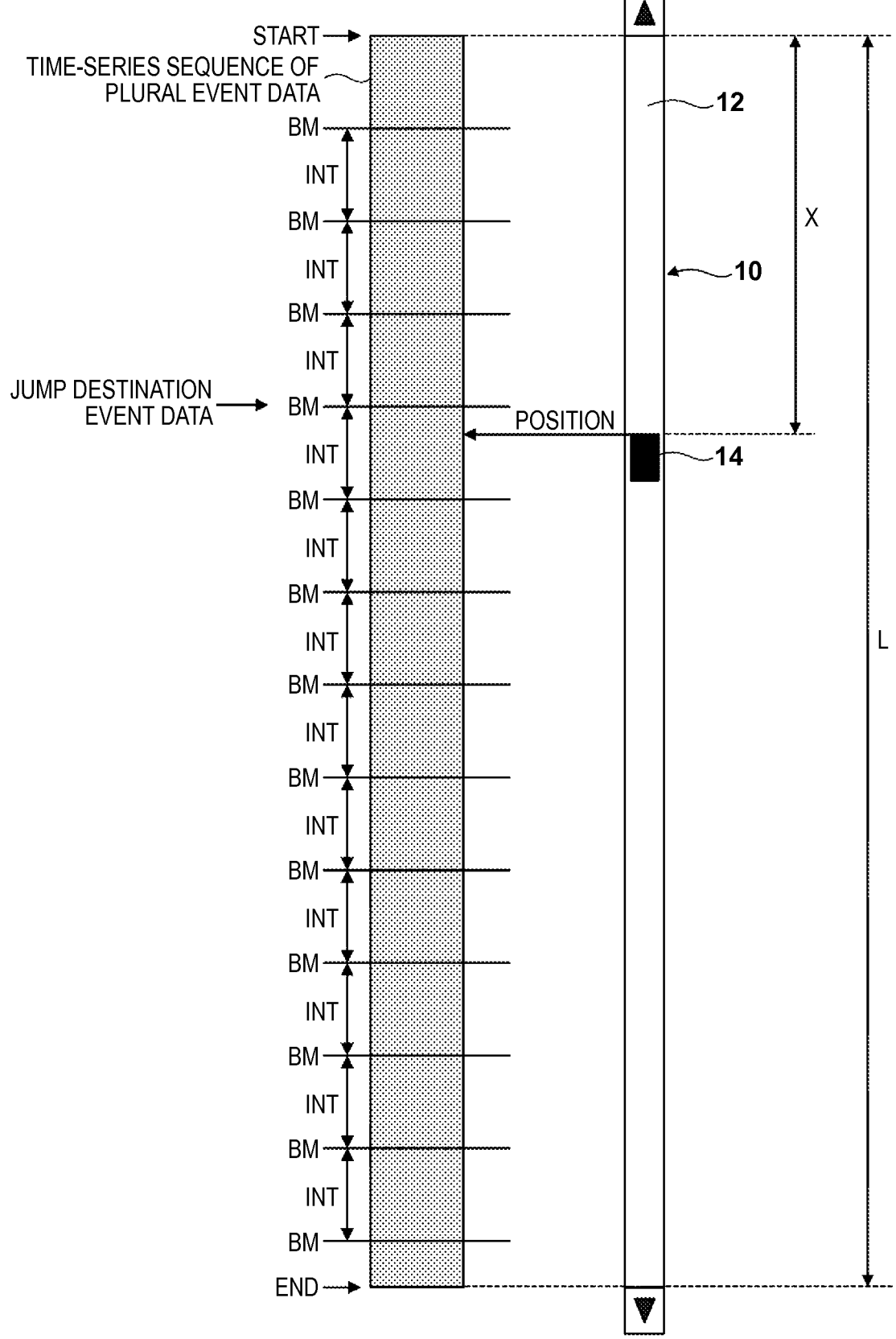
FIG. 5 is a view showing the time-series sequence of a plurality of processing target event data and a scroll bar side by side.

FIG. 5 shows the time-series sequence of the plurality of processing target event data and a scroll bar 10 side by side for the sake of description. A position ("position" in FIG. 5) in the time-series sequence of the plurality of processing target event data is designated by the relative position of a scroll thumb 14 in a scroll box 12. For example, let L be the length of the scroll box 12 and X be the position of the scroll thumb 14 in the scroll box 12 (a distance from one end of the scroll box 12). Then, the relative position of the scroll thumb 14 in the scroll box 12 is represented by X/L. The designation information for designating a position in the time-series sequence of the plurality of processing target event data can be, for example, information corresponding to X/L (for example, the value of X/L or the values of X and L).

The position ("position" in FIG. 5) in the time-series sequence of the plurality of processing target event data is given by using various methods. As an example, consider a case in which the position is represented by a number n of event data from the first event data to event data at the position in the time-series sequence of the plurality of processing target event data. In this case, if the number of the plurality of processing target event data is N, the position n can be given by, for example, $n=[N \cdot X/L]$.

For example, the specification unit 126 acquires information corresponding to X/L as the designation information for designating the position in the time-series sequence of the plurality of processing target event data from the scroll function 124. The specification unit 126 then specifies, as jump destination event data, bookmarked event data BM at a position close to the position designated by the designation information in the time-series sequence of the plurality of processing target event data among the bookmarked event data BM determined by the determination unit 130. For example, the specification unit 126 specifies, as jump destination event data, event data which is close to the position designated by the designation information in the time-series sequence of the plurality of processing target event data and is closer to a start position in the sequence among the bookmarked event data BM determined by the determination unit 130. Alternatively, the specification unit 126 may specify, as jump destination event data, event data which is close to the position designated by the designation information in the time-series sequence of the plurality of processing target event data and is closer to an end position in the sequence among the bookmarked event data BM determined by the determination unit 130.

The control unit 128 controls the scroll function 124 to start scrolling from or near the jump destination event data. Note that although the control unit 128 typically controls the scroll function 124 to start scrolling from the jump destination event data, it may control the scroll function 124 to start scrolling near the jump destination event data (from event data a predetermined number of event data before the jump destination event data). The control unit 128 provides the scroll function 124 with information for specifying event data from which scrolling should be started. The information may indicate the position (for example, the number n of event data counted from the first one) of the event data from which scrolling should be started, an address where event data from which scrolling should be started is stored, or another information. Let m be the number of addresses assigned to one event data, and AS be the first address of the event data group stored in the database. Then, the address can be given by $AS+m \cdot n$. Referring to FIG. 5, for example, if the first address is 1000, the number m of addresses assigned to one event data is 5, and the position n of event data from which scrolling should be started or the number n of event data counted from the first one is 4, the address where the event data from which scrolling should be started is stored is given by $AS+m \cdot n=1200$.

If event data includes an identifier, the specification unit 126 may specify jump destination event data based on the identifier. In this method, a table 132 which associates the position of each bookmarked event data BM in the time-series sequence of the plurality of processing target event data with the identifier of the bookmarked event data BM can be used. When the determination unit 130 determines the bookmarked event data BM, a generation unit 134 can generate the table 132 based on the positions of the bookmarked event data BM in the sequence and the identifiers of the bookmarked event data BM. For example, a serial number is preferably used as an identifier. In FIG. 5, assume that the serial number of the first bookmarked event data BM is set to 0201, that of the second bookmarked event data BM is set to 0301, and that of the jump destination event data BM is set to 1101. In this case, it is possible to associate the position of each bookmarked event data BM in the time-series sequence of the plurality of processing target event data with the identifier of the bookmarked event data BM.

Under the control of the control unit 128, the scroll function 124 starts scrolling from or near the jump destination event data. More specifically, the scroll function 124 acquires event data from which scrolling should be started and subsequent event data from the database 114 or the extraction unit 118, generates image data to be displayed on the display unit 120, and provides the image data to the display unit 120.

According to this embodiment, the specification unit 126 acquires a scroll request containing designation information for designating a position in the time-series sequence of the plurality of processing target event data from the scroll function 124, and specifies, as jump destination event data, event data at a position close to the position designated by the designation information in the sequence among the bookmarked event data BM. The control unit 128 then controls the scroll function 124 to start scrolling from or near the jump destination event data. Even if, therefore, the number of event data corresponding to the moving amount of the scroll thumb 14 is huge, not all the event data are accessed, and thus it is possible to immediately start scrolling in response to a scroll request.

Figure 3:
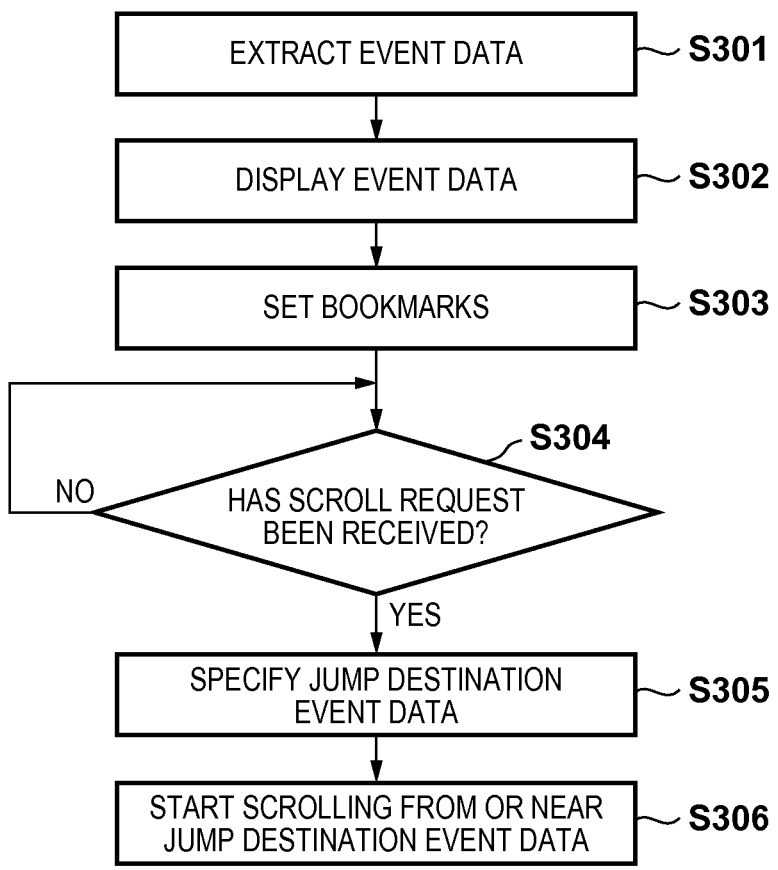
FIG. 3 is a flowchart exemplarily illustrating the operation procedure of the information processing apparatus with regard to scrolling.

FIG. 3 is a flowchart exemplarily illustrating the operation procedure of the information processing apparatus 100 with regard to scrolling. In step S301, the extraction unit 118 extracts event data satisfying designated conditions (for example, a period from which data should be extracted and an event type to be extracted) from the event data group stored in the database 114.

In step S302, the display control unit 122 displays some of the event data extracted by the extraction unit 118 on the display unit 120 in, for example, the form shown in FIG. 1.

In step S303, the determination unit 130 determines, as the bookmarked event data BM, a plurality of event data existing at the intervals INT in the time-series sequence of the event data extracted by the extraction unit 118 (that is, the plurality of processing target event data).

In step S304, the specification unit 126 stands by for reception of a scroll request from the user via the scroll function 124. Upon receiving a scroll request, in step S305 the specification unit 126 specifies jump destination event data based on designation information contained in the scroll request.

In step S306, the control unit 128 controls the scroll function 124 to start scrolling from or near the jump destination event data.

The above-described steps executed by the elements such as the determination unit 130, the specification unit 126, the control unit 128, the generation unit 134, the setting unit 136, and the extraction unit 118 of the information processing apparatus 100 can be represented as a determination step, specification step, control step, generation step, setting step, and extraction step. If the information processing apparatus 100 is formed by incorporating a computer program in a general-purpose computer, the computer program can include an instruction group for causing the computer to execute the determination step, specification step, control step, generation step, setting step, and extraction step.

For example, the computer program can be stored in a computer-readable storage medium and then provided to the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus for processing a plurality of event data generated by a processing apparatus for processing a member, the apparatus comprising:
   a display;
   a computer including a display controller having a scroll function of scrolling event data displayed on the display in response to a user operation, and a setter configured to set a plurality of intervals with each interval including a number of event data in accordance with an information processing capability of the computer, or a user instruction, wherein each interval has a same number of events;
   wherein the computer is configured to determine a plurality of bookmarked event data existing at the interval in a time-series sequence of the plurality of event data;
   the computer is further configured to acquire a scroll request containing designation information for designating a position in the sequence from the scroll function of the display controller, and specify, as jump destination event data, bookmarked event data at a position close to the position designated by the designation information in the sequence, among the plurality of bookmarked event data;
   the scroll function causes the display controller to display, on a display screen, a scroll bar including a scroll box and a scroll thumb, the scroll box having a length to be corresponded to the number of the plurality of event data, the position in the sequence of the plurality of event data being given by a relative position of the scroll thumb in the scroll box; and
   the computer is further configured to cause the scroll function of the display controller to start scrolling event data of the plurality of event data on a display screen of the display from or near the jump destination event data.

2. The apparatus according to claim 1, wherein the computer is further configured to specify, as the jump destination event data, bookmarked event data which is close to the position designated by the designation information in the sequence and is closer to a start position in the sequence, among the plurality of bookmarked event data.

3. The apparatus according to claim 1, wherein the computer is further configured to extract event data satisfying a designated condition from an event data group,
   wherein the event data extracted are processed as the plurality of event data.

4. The apparatus according to claim 1, wherein each event data includes an identifier,
   the computer is further configured to:
   generate a table which associates a position of each of the plurality of bookmarked event data in the sequence with an identifier of the event data,
   specify an identifier corresponding to the position designated by the designation information in the sequence by referring to the table, and
   specify bookmarked event data having the specified identifier as the jump destination event data.

5. The apparatus according to claim 1, wherein the scroll function causes the display controller to display, on the display screen, a scroll bar having a scroll box and a scroll thumb, and
   wherein the position in the sequence is given by $n=[N \cdot X/L]$ where n is the position in the sequence, L is a length of the scroll box, X is a position of the scroll thumb, and N is the number of the plurality of event data.

6. The apparatus according to claim 1, wherein the number of the plurality of bookmarked event data is equal to the number obtained by dividing the number of the plurality of event data with the interval.

7. The apparatus according to claim 1, wherein the setter is configured to set the number of event data in accordance with an information processing capability of the computer.

8. The apparatus according to claim 1, wherein the setter is configured to set the number of event data in accordance with a user instruction.

9. An information processing method of processing, by a computer, a plurality of event data generated by a processing apparatus for processing a member, the computer including a display controller having a scroll function of scrolling event data displayed on a display in response to a user operation, the method comprising:
- setting a plurality of intervals with each interval including a number of event data in accordance with an information processing capability of the computer, or a user instruction, wherein each interval has a same number of events;
- determining a plurality of bookmarked event data existing at the interval in a time-series sequence of the plurality of event data;
- acquiring a scroll request containing designation information for designating a position in the sequence from the scroll function of the display controller, and specifying, as jump destination event data, bookmarked event data at a position close to the position designated by the designation information in the sequence, among the plurality of bookmarked event data;
- the scroll function causes the display controller to display, on a display screen, a scroll bar including a scroll box and a scroll thumb, the scroll box having a length to be corresponded to the number of the plurality of event data, the position in the sequence of the plurality of event data being given by a relative position of the scroll thumb in the scroll box; and
- causing the scroll function of the display controller to start scrolling event data of the plurality of event data on a display screen of the display from or near the jump destination event data.

10. The information processing method according to claim 9, wherein the number of event data is set in accordance with an information processing capability of the computer.

11. The information processing method according to claim 9, wherein the number of event data is set in accordance with a user instruction.

12. A non-transitory storage medium storing a computer program for causing a computer to execute an information processing method of processing a plurality of event data generated by a processing apparatus for processing a member, the computer including a display controller having a scroll function of scrolling event data displayed on a display in response to a user operation, the information processing method comprising:
- setting a plurality of intervals with each interval including a number of event data in accordance with an information processing capability of the computer, or a user instruction, wherein each interval has a same number of events;
- determining a plurality of bookmarked event data existing at the interval in a time-series sequence of the plurality of event data;
- acquiring a scroll request containing designation information for designating a position in the sequence from the scroll function of the display controller, and specifying, as jump destination event data, bookmarked event data at a position close to the position designated by the designation information in the sequence, among the plurality of bookmarked event data;
- the scroll function causes the display controller to display, on a display screen, a scroll bar including a scroll box and a scroll thumb, the scroll box having a length to be corresponded to the number of the plurality of event data, the position in the sequence of the plurality of event data being given by a relative position of the scroll thumb in the scroll box; and
- causing the scroll function of the display controller to start scrolling event data of the plurality of event data on a display screen of the display from or near the jump destination event data.

13. The non-transitory storage medium according to claim 12, wherein the number of event data is set in accordance with an information processing capability of the computer.

14. The non-transitory storage medium according to claim 12, wherein the number of event data is set in accordance with a user instruction.

* * * * *